(12) United States Patent
Chauvin et al.

(10) Patent No.: US 9,849,622 B2
(45) Date of Patent: Dec. 26, 2017

(54) METHOD OF BLOWING, FILLING AND CAPPING CONTAINERS

(71) Applicant: NESTEC S.A., Vevey (CH)

(72) Inventors: Guillaume Chauvin, Monthureux sur Saone (FR); Damien Kannengiesser, Golbey (FR); Erik Lupke, The Hague (NL)

(73) Assignee: DISCMA AG, Hunenberg (CH)

( * ) Notice: Subject to any disclaimer, the term of this patent is extended or adjusted under 35 U.S.C. 154(b) by 426 days.

(21) Appl. No.: 14/377,773

(22) PCT Filed: Feb. 1, 2013

(86) PCT No.: PCT/EP2013/051986
§ 371 (c)(1),
(2) Date: Aug. 8, 2014

(87) PCT Pub. No.: WO2013/117492
PCT Pub. Date: Aug. 15, 2013

(65) Prior Publication Data
US 2015/0021833 A1   Jan. 22, 2015

(30) Foreign Application Priority Data
Feb. 10, 2012  (EP) .................................... 12154805

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B29C 49/783* (2013.01);
(Continued)

(58) Field of Classification Search
CPC ...... B29C 2049/465; B29C 2049/4664; B29C 2049/4652
See application file for complete search history.

(56) References Cited

U.S. PATENT DOCUMENTS 3,162,706 A   12/1964  Cheney
3,196,592 A    7/1965  Cheney
(Continued)

FOREIGN PATENT DOCUMENTS

JP   2002046725       2/2002
JP   2011088639       5/2011
WO   2011076167 A1   6/2011

OTHER PUBLICATIONS

International Search Report for International Application No. PCT/EP2013/051986 dated May 27, 2013.
(Continued)

*Primary Examiner* — Galen Hauth
(74) *Attorney, Agent, or Firm* — Eric J. Sosenko; Jonathan P. O'Brien; Honigman Miller Schwartz and Cohn LLP

(57) ABSTRACT

The invention concerns a method of blowing and filling a container (120) from a preform, the method comprising: —placing a preform within a mold (140), —stretching the preform —injecting a liquid into the preform after the stretching has started so as to cause expansion of the preform within the mold, thereby obtaining a blown and filled container (120), —capping the blown and filled container (120).

6 Claims, 5 Drawing Sheets

(51) Int. Cl.
*B29C 49/78* (2006.01)
*B65B 3/02* (2006.01)
*B67B 3/20* (2006.01)
*B65B 7/28* (2006.01)
*B29D 22/00* (2006.01)
*B29L 31/00* (2006.01)

(52) U.S. Cl.
CPC ............ *B29D 22/003* (2013.01); *B65B 3/022* (2013.01); *B65B 7/2835* (2013.01); *B67B 3/20* (2013.01); *B29C 2049/4602* (2013.01); *B29C 2049/4664* (2013.01); *B29L 2031/7158* (2013.01); *B65B 7/2878* (2013.01)

(56) References Cited

U.S. PATENT DOCUMENTS

| | | | |
|---|---|---|---|
| 3,251,915 A | | 5/1966 | Pechthold |
| 4,497,855 A | * | 2/1985 | Agrawal .............. B65D 1/0223 215/373 |
| 4,539,172 A | | 9/1985 | Winchell et al. |
| 4,950,153 A | * | 8/1990 | Dundas .................. B29C 49/46 264/525 |
| 5,064,081 A | * | 11/1991 | Hayashi ............... B65D 1/0223 215/373 |
| 5,293,809 A | | 3/1994 | Van Der Heijden et al. |
| 5,350,483 A | | 9/1994 | Yager et al. |
| 5,362,222 A | | 11/1994 | Faig et al. |
| 6,214,282 B1 | | 4/2001 | Katou et al. |
| 6,381,926 B1 | | 5/2002 | Weiler et al. |
| 8,458,992 B2 | | 6/2013 | Zanini et al. |
| 2003/0041560 A1 | | 3/2003 | Kemnitz |
| 2006/0242929 A1 | | 11/2006 | Servadei et al. |
| 2011/0135778 A1 | * | 6/2011 | Andison ................. B29C 49/46 425/524 |
| 2012/0266567 A1 | * | 10/2012 | Haesendonckx ....... B65B 3/022 53/456 |

OTHER PUBLICATIONS

International Written Opinion for International Application No. PCT/EP2013/051986 dated May 27, 2013.

* cited by examiner

METHOD OF BLOWING, FILLING AND CAPPING CONTAINERS

CROSS REFERENCE TO RELATED APPLICATIONS

The present application is a National Stage of International Application No. PCT/EP2013/051986, filed on Feb. 1, 2013, which claims priority to European Patent Application No. 12154805.1, filed Feb. 10, 2012, the entire contents of which are being incorporated herein by reference.

FIELD OF THE INVENTION

The invention relates to a method of blowing, filling and capping containers with liquid from preforms.

BACKGROUND

Plastic containers such as bottles of water are manufactured and filled according to different methods including blow moulding or stretch-blow moulding.

According to one of these known methods a plastic preform is first manufactured through a moulding process and then heated before being positioned inside a blowing mould.

The preform usually takes the form of a cylindrical tube closed at its bottom end and open at its opposite end.

Once the preform has been positioned within the mould only the open end of the preform is visible from above the mould.

The above-mentioned method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated a liquid is injected into the preform through its open end during a filling phase, as disclosed for instance in Applicant's patent EP 1 529 620 B1. This liquid injection causes together with the stretching expansion of the preform until coming into contact with the inner walls of the mould, thereby achieving the final shape of the container.

The container that has been formed and filled with liquid, e.g. water, is then provided with a cap before being manipulated, shipped, stacked, carried, etc.

Typically bottles of water are grouped into packs or packages and then assembled together on a pallet.

Pallets are next transported in trucks or trains and may sometimes be stacked upon each other.

In such situations the bottles are exposed to strong external forces and loads and must be resistant thereto.

In particular, they need to be resistant to loads applied from the top.

If the mechanical strength of the container or bottle is not sufficient, the pallets may run the risk of collapsing, which could lead to rejection by the customer or even give rise to dangerous situations, accidents and possible injuries caused to people.

The trend from the market and consumers for sustainable and cost effective packaging solutions has been rising over the last years.

As a consequence, the beverage industry has reduced the quantity of material used in the manufacture of plastic containers, in particular bottles.

However, this reduction in material has come to its limits since the filled containers have to be resistant to strong external forces and loads as explained above.

There is therefore a need to increase the stability of containers.

One solution is to use more material for manufacturing the containers.

However, this solution goes against the above-mentioned trend.

Another solution is to add nitrogen or pressurized air in the filled container.

However, this solution involves an additional machine or piece of equipment and a further manufacturing step which requires, in particular, supplying a pressurized cleaned gas.

In addition, a specific container base or bottom part is needed for supporting this solution.

This requires additional material which is not appreciated by the consumers.

SUMMARY OF THE INVENTION

The invention has been conceived having the foregoing in mind.

In this respect, the invention is directed to a method as defined in claim 1.

By timely capping the blown and liquid-filled container a slight pressure is being built up inside the closed container, which makes it possible for the latter to better withstand external forces and loads. The top load resistance of the container gets therefore improved.

Thanks to the invention no additional machine or further manufacturing step or pressurized cleaned gas in the process is needed.

The method according to the invention is therefore easy to implement and cheap.

Also, even lightweight containers may be given an enhanced top load resistance and may, therefore, be stored and transported safely.

The Applicant has noticed that during the performance of a stretch-blow moulding and filling method shrinking of the container occurs. Such a shrinkage is undesired since it reduces the filling capacity of the container.

In order to avoid or limit shrinking of the container the temperature of the mould has to be closely controlled during the process.

The Applicant has discovered that the pressure inside the container and, therefore, the top load resistance of the container may be further enhanced by favouring shrinkage of the container during the process and quickly capping the container. This is because shrinking of the container causes the inner pressure to rise. A quick capping of the container makes it possible to stop, or at least limit, the shrinkage.

Thus, the stretch-blow moulding and filling method may be simplified since the temperature of the mould during the process need not be controlled as much as in the past.

More particularly, less calories than in the past need to be evacuated by the cooling circuit of the mould.

According to a possible feature, the capping is performed between 1 s and 2 mn after obtaining the blown and filled container.

Thus, the capping may take place within a predetermined period of time lying between 1 s and 2 mn after the container has been blown and filled with liquid. The mechanical strength of the container is thus sufficiently reinforced for being subsequently stored under other containers and the like and transported.

According to a possible further feature depending on the latter, the capping is performed 1 s and 30 s after obtaining the blown and filled container.

This shorter range of time provides greater efficiency and thus further enhanced top load resistance.

The invention is also directed to an apparatus as defined in claim 4.

In the apparatus according to the invention the capping head is located between the injection head and the mould during the blowing and filling of the container (through stretching and expansion operations). Thus, once the container has been blown and filled there is no need to raise the injection head and bring a capping head between the latter and the mould which still encloses the container since the capping head is already in place, at the appropriate location.

Thus, thanks to this apparatus the capping may be performed within a predetermined period of time so as to build up a pressure lying between 0.3 and 1.5 bars inside the capped container.

More particularly, thanks to this apparatus the capping may be performed between 1 s and 2 mm or, for example, between 1 s and 30 s after obtaining the blown and filled container.

There is no need either to transfer the filled and opened container towards a distant station equipped with a capping head, thereby avoiding, or at least reducing, splashing of the liquid when being moved.

Thus, the whole process gets simplified and much faster than in the prior art. Fast capping is therefore achieved, thereby making it possible to obtain the advantages set forth above in relation to the method.

According to a possible feature, the capping head has a traversing hole that is centered about an axis of alignment along which the injection head and the mould are aligned, said traversing hole enabling injection of the liquid into the opening of the container from the injection head.

Thus, the traversing hole of the capping head is arranged between the injection head and the mould and, more particularly, is facing both the outlet of the injection head through which liquid exits and the dispensing opening of the container.

It is to be noted that the axis of alignment also passes by the dispensing opening of the container, in the middle thereof.

According to one possible feature, the capping head is mounted on the injection head.

This provides a simple arrangement of the capping head between the injection head and the mould.

More particularly, the capping head is mounted under the injection head.

According to a more specific possible feature, the capping head is rotatably mounted relative to the injection head.

This mounting is particularly convenient for a subsequent step during which a cap will be screwed around the neck of the dispensing opening.

However, other kind of capping operations may be envisaged which do not require a rotating capping head.

Thus, other capping techniques may be envisaged such as screw capping, press-on capping, sealing capping (with aluminum foil), and ultrasonic sealing capping.

According to another possible feature, the apparatus comprises driving means for driving the capping head in rotation around an axis of rotation that coincides with the axis of alignment of the injection head and the mould.

Thus, the apparatus comprises appropriate means for driving a capping head in rotation with a view to fixing a cap on the dispensing opening of the container.

Such driving means can be permanently integrated in the apparatus, which, therefore, does not necessitate bringing them close to the capping head when needed.

More particularly, said driving means may be laterally offset relative to the axis of rotation.

This arrangement makes it possible to accommodate said driving means in the apparatus in a permanent manner (the driving means are located in a position which does not hinder the longitudinal movement of the injection head), while the capping head is permanently disposed between the injection head and the mould.

Thus, the laterally offset driving means enable driving in rotation of the capping head for capping purpose without changing the position of the capping head and the driving means after the container has been blown and filled.

According to one possible feature, said driving means are coupled to the periphery of the capping head, e.g. through a mesh engagement.

According to another possible feature, said driving means are activated while the container is maintained within the mould in a fixed position.

This feature is advantageous in that the mould enclosing the blown and filled container remains at the same location as that occupied during the blowing and filling process and still keeps the container in place.

Splashing of the liquid in the container is therefore avoided.

According to another possible feature, said driving means comprise a brushless motor.

These kinds of driving means enable accurate control of the screwing torque during the screwing operation of a cap around the threaded neck of the dispensing opening.

Alternatively, another kind of motor may be envisaged together with a magnetic coupling.

It is to be noted that the mould maintaining the container in position during the capping operation is used as an anti-rotating means.

According to another possible feature, the capping head has receiving means for receiving a cap to be fixed on the opening of the container and holding means for holding said cap within said receiving means.

According to another possible feature, said receiving means comprise the traversing hole.

Thus, the cap is received within the traversing hole and may be tightly fitted therein thanks to appropriate sizing of the internal dimensions of the traversing hole and external dimensions of the cap.

According to a possible feature, said holding means are arranged around the traversing hole.

Such holding means may be, e.g. the internal walls of the traversing hole and/or elastic means provided therein.

According to another possible feature, said stretching means comprise a stretch rod.

In a conventional manner, such stretching means are used during the stretching phase for stretching the preform within the mould.

According to another possible feature, the apparatus comprises actuation means for causing the stretch rod to move downwardly towards the receiving means in which a cap may be blocked.

The stretch rod has a dual purpose since it both participates in stretching the preform within the mould during the blowing and filling process and releasing a cap which has been blocked within the receiving means of the capping head.

According to another possible feature, the injection head is mobile in a translational movement. This movement is performed along the longitudinal axis of alignment of the injection head and the mould.

According to another possible feature, the injection head and the capping head are mobile together in a translational movement so as to bring the capping head against the mould or move it away therefrom.

Such a translational movement makes it possible for the capping head to come into contact with the mould around the dispensing opening of the container. For instance, this may occur during the blowing and filling process. Such a movement makes it possible for the capping head to move away from the mould, e.g. when a cap has to be provided to the capping head.

According to another possible feature, the apparatus comprises:

bringing means for bringing a cap to be fixed on the opening of the container between the capping head and the mould after the capping head has been moved away from the mould, and positioning means for positioning said cap within the receiving means of the capping head.

BRIEF DESCRIPTION OF THE DRAWINGS

Embodiments of the present invention will now be described, by way of example only, with reference to the accompanying figures in which.

DESCRIPTION OF THE PREFERRED EMBODIMENTS

Figure 1:
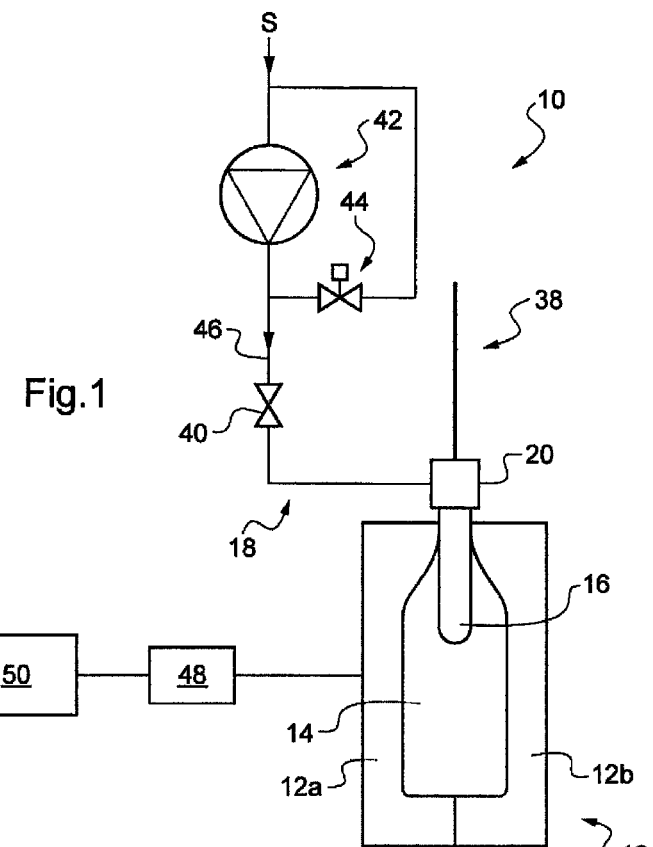
FIG. 1 is a schematic view of an apparatus for simultaneously blowing and filling containers according to an embodiment of the invention.

FIG. 1 schematically represents an apparatus 10 in which is implemented a method for simultaneously blowing and filling containers, such as bottles, from preforms according to an embodiment of the invention. It is to be noted that the invention is not limited to such an apparatus.

These preforms may be made of thermoplastic polymer.

Apparatus 10 comprises a blowing mould 12 for enclosing a preform. Such a preform is first manufactured through a moulding process and then heated before being positioned within mould 12 as disclosed in Applicant's patent EP 1 529 620 B1.

The preform usually assumes the shape of a cylindrical tube closed at its bottom end and open at its opposite end.

Mould 12 is for example a two-part mould of which the two parts or side halves 12a, 12b define an inner cavity 14 when assembled together.

Firstly, the two side halves are spaced apart from each other under the action of moving means (not represented in the drawing) for inserting a preform 16 therebetween.

The moving means may be piston devices for example.

Next the two side halves 12a and 12b are moved back toward each other so as to come into contact along a joint plane.

As represented in FIG. 1, preform 16 is inserted into cavity 14 before the beginning of a blowing and filling method according to the invention.

Once the preform has been positioned within mould 12 only the open end of the preform is visible from above the mould.

The shape of the cavity corresponds to the shape of the achieved container and it will be wholly occupied by the formed container at the end of the blowing and filling method.

It is to be noted that mould 12 may alternatively be composed of more than two parts depending on the manufacturing process.

For instance, a third part (base or bottom part) may be added at the bottom of the mould so as to define at least a part of the inner cavity bottom.

Apparatus 10 further comprises a liquid injection circuit 18 and injection means for injecting a liquid into preform 16.

Injection means comprise an injection head 20 which comes into a sealing contact (for liquid tightness purpose) with mould 12 and preform 16.

Figure 2:
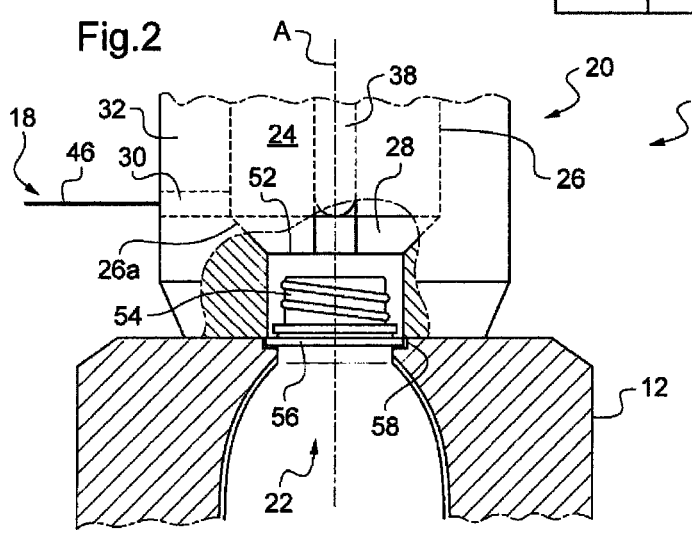
FIG. 2 is a schematic enlarged partial view of the injection head and mould represented in FIG. 1.

FIG. 2 is a schematic enlarged partial view of injection head 20 disposed above mould 12.

Mould 12 encloses a blown and filled container 22 (here, for example, a bottle filled with water) that has been obtained from preform 16 through the blowing and filling method that will be described subsequently.

The injection head comprises an injection valve device 24 that includes an injection nozzle 28 mounted within an inner housing 26.

Injection head 20 is substantially cylindrical in shape as partially illustrated in FIG. 2 and inner housing 26 is also cylindrical in shape and both are coaxial.

Injection valve device 24, and more particularly injection nozzle 28, is movable along a longitudinal axis A between an injection position (open position) allowing liquid to be injected into the preform and a rest position (closed position) in which the injection nozzle 28 rests against an inner surface 26a of the injection head in a sealing engagement so as to prevent any flow of liquid from the injection head into the preform.

Longitudinal axis A is here the vertical axis along which injection head 20 and mould 12 are substantially aligned.

Axis A is a symmetry axis to container 22 as well as to preform 16.

As represented in FIG. 2, injection nozzle 28 is in the closed position (lower position) which is occupied when the container has been blown and filled at the end of the manufacturing method.

In the open position injection nozzle 28 is in an upper position at a distance from the inner surface 26a. This upper position is not represented in the drawing for the sake of clarity but it is located above a transverse channel 30 (represented in dotted lines) that is provided in a peripheral wall 32 of injection head 20.

This feed channel is connected to liquid injection circuit 18.

Moving the injection nozzle 28 away from inner surface 26a and above channel 30 makes it possible for the liquid that is in the circuit 18 to flow from channel 30 to the preform (in FIG. 2 the preform 16 of FIG. 1 is replaced with the formed container 22).

Apparatus 10 also comprises stretching means 38 for stretching preform 16 when enclosed within mould 12.

Stretching means comprise a stretch rod 38 which is in a sliding connection with the injection nozzle 28 as partially represented in FIG. 2.

For example, stretch rod 38 is in alignment with axis A and traverse injection nozzle 28 in a fluid-tight manner.

The stretch rod 38 of FIG. 1 embodiment is actuated upon command to be inserted downwardly into preform 16 so as to stretch the latter while a filling liquid is injected thereinto with a view to causing expansion of said preform within the mould.

Actuating means for actuating stretch rod 38 have not been represented for the sake of clarity.

In FIG. 2 stretch rod 38 is in a retracted position after being used.

Apparatus 10 comprises a valve device 40 that enables flowing of liquid through circuit 18 when opened and prevents liquid from flowing through the valve device and downstream thereof when closed.

Valve device 40 is actuated upon command.

Liquid to be injected into the preform, e.g. water, is supplied from a source of liquid S which feeds said liquid to a pump device 42 of system 10.

Pump device 42 is located upstream of valve device 40.

Such a pump device is suitable for delivering a constant pressure, e.g. between 3 and 7 bars.

Pump device 42 is suitable for providing a predetermined volume of liquid and pushing it through liquid injection circuit 18.

As further represented in FIG. 1, a flow valve 44 is mounted in parallel of pump device 42 as a safety valve.

This valve acts as a discharge valve in order to protect the pump device, for instance when the liquid pressure is building up or if there is no container being manufactured.

Apparatus 10 comprises a duct 46 that is connected to pump device 42 at one end and to injection head 20 at the opposite end. Valve device 40 is mounted onto duct 46. It is to be noted that duct 46 is part of liquid injection circuit 18.

Apparatus 10 also comprises temperature controlling means 48 for controlling the temperature of mould 12 in the course of performance of the method. Means 48 may be part of a processing device 50 (e.g. a computer) or distinct therefrom. Processing device 50 performs the execution of the different steps or operations of the method and, for example, controls the actuation of the different elements of the apparatus (pump device, valves, stretch rod, etc . . . ).

In the course of performance of the blowing and filling method according to an embodiment of the invention, the stretch rod 38 is actuated during a stretching phase whereas valve device 40 is in a closed position, thereby preventing liquid from being injected into preform 16.

Stretch rod 38 is downwardly engaged into the open end of the preform 16 so as to come into contact with the closed bottom end thereof. The stretch rod is then further actuated to push the closed end downwardly and stretch the preform accordingly in a controlled manner.

After a predetermined period of time has elapsed following the start of the stretching phase, the injection phase starts for injecting the liquid into the preform both for forming the container and filling it.

The temperature of the mould is less strictly controlled than in the prior art since shrinkage of the container is allowed to some extent. By way of example, in a conventional process, approximately 4,500 kJ need to be evacuated per mould and per hour.

The invention makes it possible to reduce this value.

The injection phase starts with the opening of valve device 40 and operation of pump device 42. Actuation of valve device 40 is controlled through processing means 50.

Also injection nozzle 28 is actuated to be raised in its upper position (open position) under the control of processing means 50.

Pump device 42 is operated in a controlled manner so that liquid is pushed or displaced through liquid injection circuit 18 and injection head 20 to preform 16 (for being injected thereinto) in accordance with a predetermined injection or filling curve. Liquid is injected into preform 16 while the preform is being stretched so as to cause expansion of said preform within mould 12. EP 1 529 620 B1 provides further details on an embodiment of a blowing and filling method.

In FIG. 2 only the upper part of a blown and liquid-filled container has been represented at the end of the injection phase.

As illustrated, the open end of the preform has been shaped into a dispensing opening 52 that protrudes from above the mould.

Opening 52 has a neck 54 with an outside thread and a flange or neck ring 56 that is provided at the basis of the neck.

In particular, neck ring 56 rests against a shoulder 58 provided at the upper part of the mould around the container 22.

The blown and filled container 22 assumes the complementary shape to that of the inner walls of the mould illustrated in FIG. 1.

Figure 3:
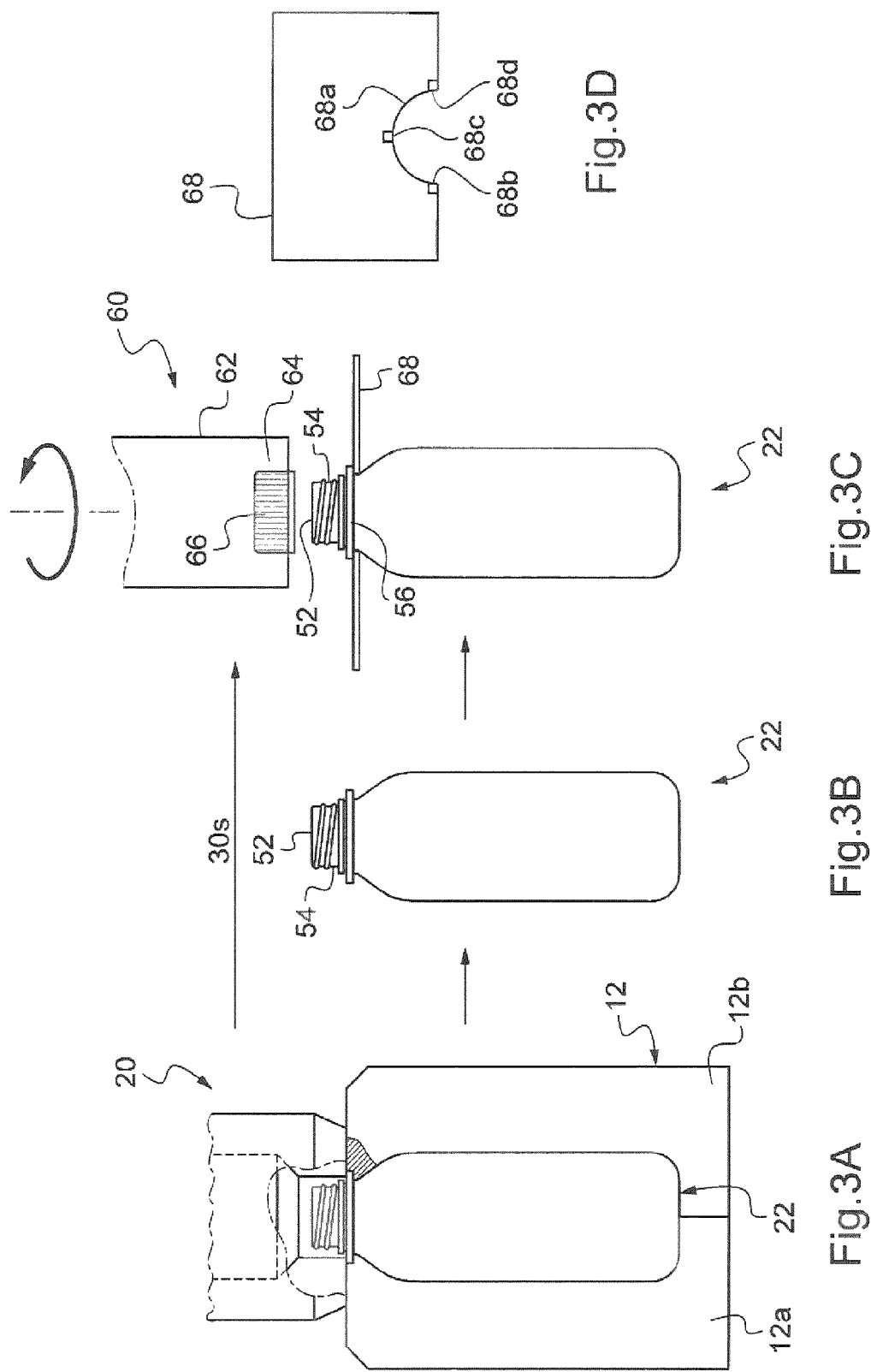
FIG. 3A represents a blown and liquid-field container 22 within mould 12.
FIG. 3B represents container 22 out of its mould.
FIG. 3C represents container 22 at a capping station.
FIG. 3D is a partial view of supporting means for supporting container 22 at the capping station.

The blown and liquid-filled container 22 has been wholly represented in FIG. 3A inside mould 12.

The method further comprises a step of opening the mould by moving the two mould side halves 12*a* and 12*b* away from each other so as to release container 22 from the mould.

Container 22 is next handled by known handling means (not represented in the drawings for the sake of clarity) for being extracted from the mould and moved therefrom.

FIG. 3B illustrates container 22 out of mould 12.

Container 22 is transported to a next station 60 of the apparatus as partially represented in FIG. 3C.

Station 60 comprises a capping head 62 which has holding means 64 for holding a cap 66.

Cap 66 is intended to be fixed onto neck 54 of container 22.

As represented in FIG. 3C, container 22 is brought into a position located below capping head 62 so that cap 66 is precisely above dispensing opening 52.

Supporting means 68 are provided and arranged around the neck of the container so as to firmly maintain the container in a fixed position during the capping operation.

More particularly, supporting means 68 are engaged with neck ring 56 under the latter.

For instance, supporting means 68 assume the shape of a rigid plate of which a half has been represented in FIG. 3D.

A central aperture 68*a*, e.g. of circular shape, is provided in the plate.

The inner dimensions of aperture 68*a* are adapted to those of neck ring 56.

Several anti-rotating means 68*b*, 68*c*, 68*d* are provided on the inner periphery of the aperture. Such means or devices are, for example, spikes.

Thus, once the container has been fixed in position thanks to supporting means 68, capping head 62 is commanded to be lowered and driven into rotation as illustrated by the rotating arrow. This rotational movement of capping head 62 causes cap 66 to be rotated around neck 54, thereby tightly screwing cap 66 around the neck of the container.

Other capping techniques may alternatively be envisaged for capping container 22. For example, press-on cap type or ultrasonic sealing techniques may be used. In case of ultrasonic sealing, the neck and the cap may be made together using over-moulding techniques.

This capping operation takes place approximately 30 s after the container has been blown and filled with liquid.

This quick capping operation enables building up a slight pressure inside the container. The thus capped container has therefore an increased mechanical strength and resistance to loading, in particular to top loading.

A plurality of so reinforced containers may be positioned upon each other in layers.

Thus assembled they form a stack that is resistant to loads applied from the top and the sides.

Thanks to this mechanical reinforcement the containers may be piled up and transported on pallets while avoiding, or at least dramatically reducing, the risks for a pile or an assembly of containers to tilt or collapse.

Figure 4:
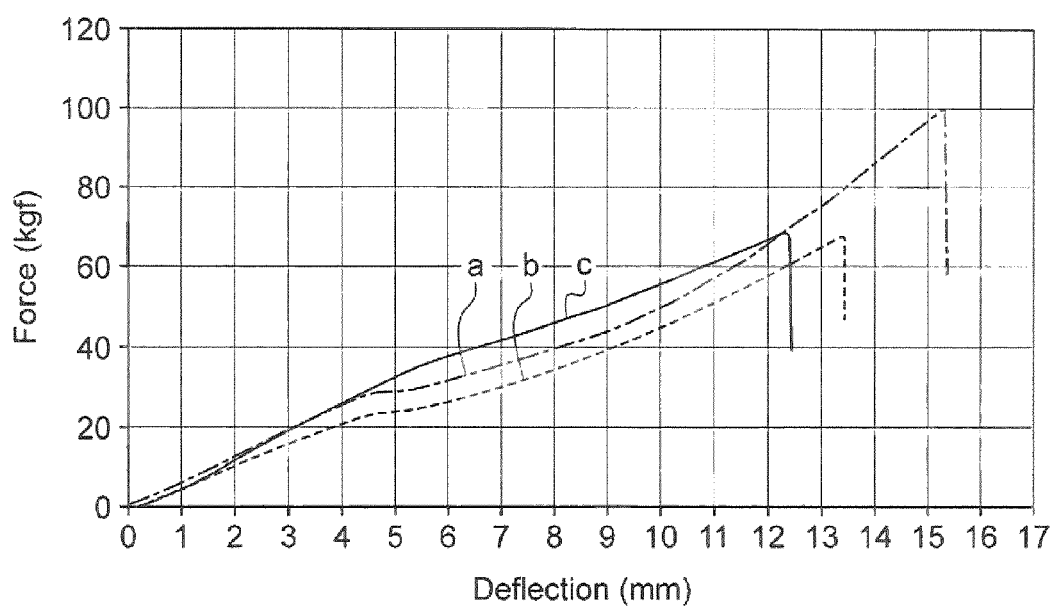
FIG. 4 illustrates the resistance to top load of three different bottles of water.

FIG. 4 shows three curves a, b, and c illustrating the mechanical resistance to top load of three different bottles filled with water.

The graph represents for each curve the vertical force exerted on the bottle (expressed in kgf) as a function of the vertical deflection of the bottle (expressed in mm).

Curve a has been obtained through a conventional blowing method applied to a preform weighing 18 g and having a length of 86 mm. The blown bottle has been capped several hours after having been blown.

Curve b has been obtained through a stretch-blow moulding and filling method applied to the same preform as for a curve a.

Curve c has been obtained through a stretch-blow moulding and filling method applied to a preform weighing 14.5 g and having a length of 78 mm.

The bottle corresponding to curve c has been capped in accordance with the invention whereas, i.e. rapidly, the bottle corresponding to curve b has been capped much later, e.g. several hours after the obtaining (forming and filling) of the bottle.

The comparison between curves a and b shows that the performance in terms of resistance to top load are similar for the same weight but with different manufacturing processes.

Curve c shows that when capping the bottle takes place rapidly after the filling the performance of the bottle in terms of resistance to top load is increased. This is because an increase in pressure has been formed within the upper part of the capped bottle.

For instance, the bottle of curve c undergoes a deflection of 5 mm under an external vertical force of almost 35 kgf whereas the same deflection is obtained with the bottles of curves a and b for a force less than 30 kgf.

Also, this performance is obtained for the bottle of curve c with a lighter bottle since it has been manufactured with approximately 4 g of PET missing.

Thus thanks to the invention lightweight containers with an increased resistance to top load may be manufactured.

Figure 5:
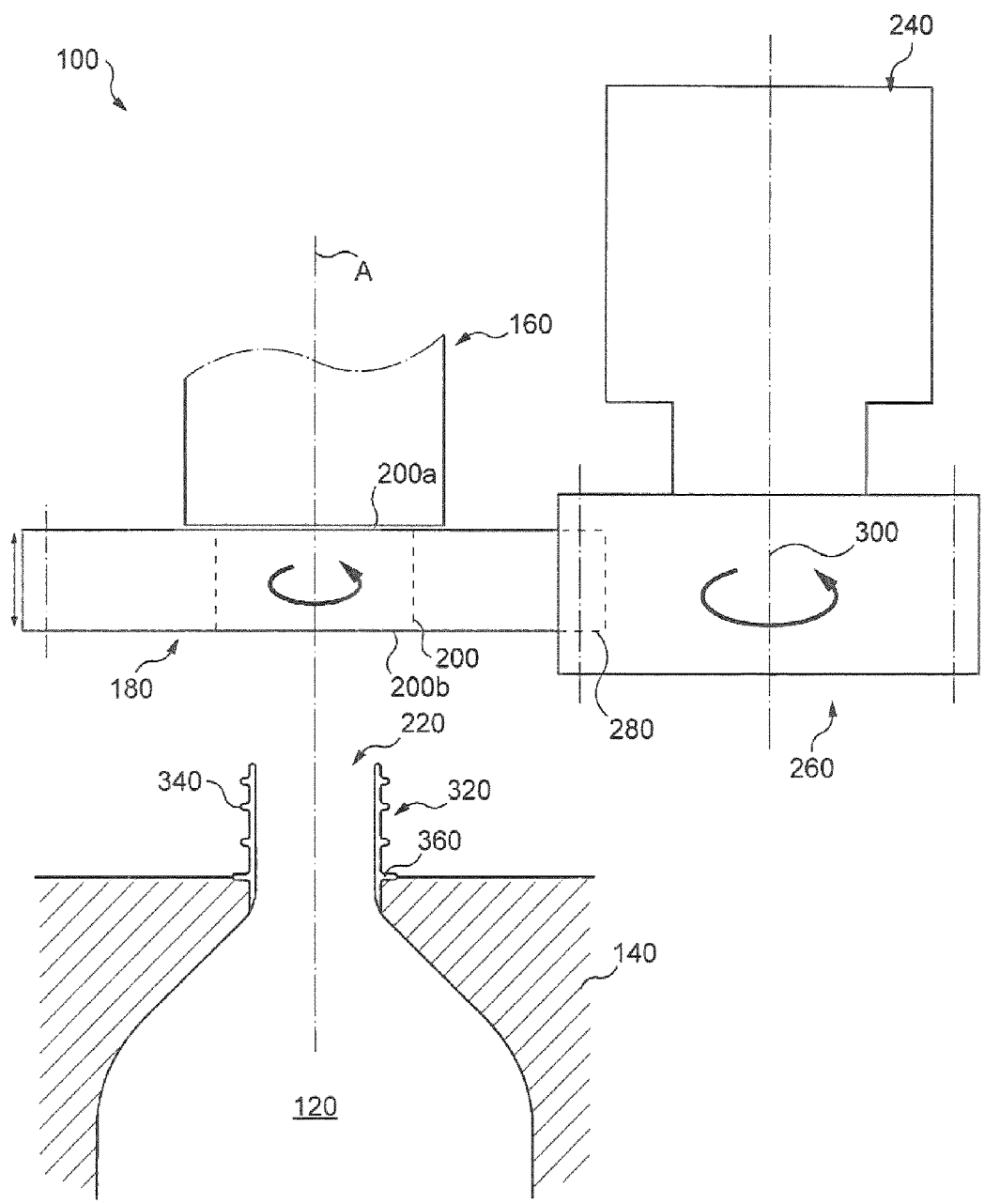
FIG. 5 is a schematic and overall view of an apparatus according to another embodiment of the invention.

FIG. 5 illustrates a schematic and partial view of the main components of an apparatus 100 for simultaneously blowing and filling a plastic container from a preform according to another embodiment of the invention. This embodiment makes it possible to implement the method according to the invention which enables capping of the blown and filled container within a short period of time.

For example, the container may be capped within 2 seconds after being blown and filled.

As represented in FIG. 5, the container is a bottle 120 which has been filled with a liquid.

Apparatus 100 comprises a mould 140 enclosing bottle 120 in the position of FIG. 5.

Also, apparatus 100 comprises an injection head 160 through which the liquid has been injected into the bottle during its shaping.

Apparatus 100 also comprises stretching means which, here, comprise a stretch rod as represented in FIGS. 1 and 2.

Apparatus 100 further comprises a capping head 180 that is rotatably mounted relative to injection head 160.

As represented in dotted lines, capping head 180 has a traversing hole 200 that is centered about a longitudinal axis A.

Axis A is an axis of alignment along which injection head 160 and mould 140 are aligned in the manufacturing configuration of FIG. 5.

Traversing hole 200 has two opposite sides 200a and 200b. Side 200a faces injection head 160 while opposite side 200b faces mould 140 and, more particularly, the dispensing opening 220 of container 120.

Although not represented in the drawings, injection head 160 has an inlet (as inlet channel 30 in FIG. 2) through which liquid flows before entering into traversing hole 200 and dispensing opening 220 when capping head 180 rests against mould 140 and traversing hole 200 surrounds dispensing opening 220.

This position is not illustrated in the drawings and represents the position in which the container is simultaneously blown and filled.

Furthermore, apparatus 100 comprises driving means 240 for driving capping head 180 in rotation around an axis of rotation that coincides with longitudinal axis of alignment A.

As represented in FIG. 5, driving means 240 are laterally offset relative to axis A and are coupled to the periphery of capping head 180.

More particularly, driving means comprise a gear 260 which cooperates with a gear 280 provided at the periphery of capping head 180.

These gears may be in a mesh engagement and, for instance, may be toothed gears.

Gear 260 is for instance mounted on the output shaft 300 of a motor 240.

Motor 240 is for example a brushless motor.

This motor makes it possible to accurately control the force transmitted to capping head 180 and therefore to the cap during the screwing process that will be described subsequently.

FIG. 5 shows a manufactured container 120 (bottle) after it has been simultaneously blown and filled (e.g. water) with a liquid through a conventional method such as described in the Applicant's patent application EP 1 529 620 and reminded of in the description made with reference to FIGS. 1 to 3A-D.

Once the container has been blown and filled according to the above-described method, a cap has to be fixed to the dispensing opening 220 of the container.

In this respect, injection head 160 and capping head 180 which are mobile together in a translational movement along axis A are caused to be raised along axis A so as to leave free sufficient space between capping head 180 and dispensing opening 220.

It is to be noted that the connection between injection head 160 and capping head 180 is a rotatable connection comprising needle bearings.

Such a rotatable connection is known to the skilled person.

It is to be noted that dispensing opening 220 has a neck 320 with an outside thread 340 and a flange 360 that is provided at the basis of the neck. Flange 360 is positioned within a recess provided in the upper part of mould 140.

FIGS. 6A to 6D illustrate successive views showing the capping process of the container.

Figure 6A:
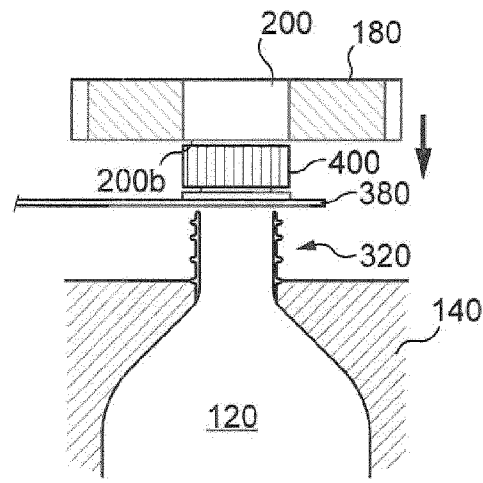
FIGS. 6A-D are successive schematic views illustrating the different operations for bringing and positioning a cap on the capping head and fixing it on the dispensing opening of the container.

FIG. 6A is a schematic and simplified view representing container 120 maintained within mould 140 and capping head 180 away from mould 140 and neck 320. Injection head 160 has not been represented for the sake of clarity.

Apparatus 100 comprises bringing means 380 for bringing a cap 400 to be fixed on dispensing opening 220. Bringing means 380 have been moved from a rest position (not represented) to an active position located between capping head 18 and dispensing opening 220.

Bringing means 380 may assume the shape of a cap distributing plate provided, for instance, with a slight recess on the upper surface thereof for positioning and maintaining in a fixed position cap 400 on the plate.

This plate may be a rotating plate comprising several caps at its periphery or an elongated plate which carries only one cap at one end and is elongated along an axis that is perpendicular to axis A.

Thus cap 400 has been brought between capping head 180 and neck 320 and positioned below traversing hole 200 vis-à-vis side 20b thereof. Injection head 160 and attached capping head 180 are actuated to be lowered towards bringing means 380 and cap 400.

Figure 6B:
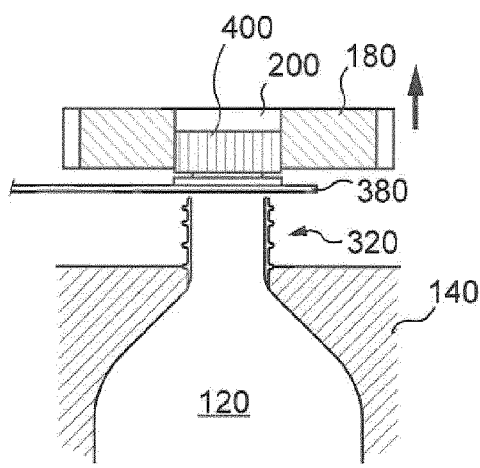

As represented in FIG. 6B, capping head 180 is moved downwardly towards neck 320 and cap 400 is forcibly engaged within traversing hole 200 as capping head 180 is actuated downwardly.

Figure 6C:
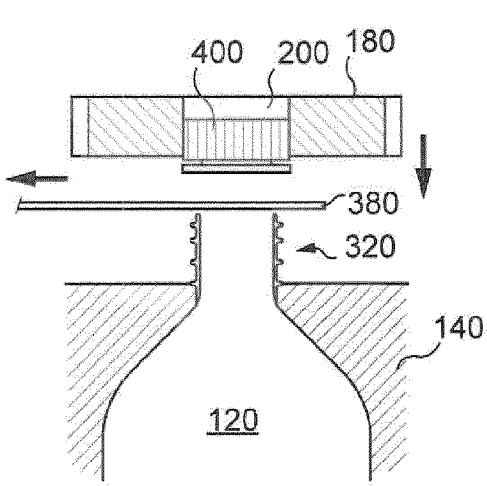

The inner dimensions of the traversing hole 200 (inner diameter) and the outer dimensions of cap 400 (outside diameter) are adjusted so that cap 400 can be introduced in force within traversing hole 200 and remain in place as represented in FIG. 6C.

It is to be noted that cap 400 is partly engaged within hole 200.

Cap 400 is kept in position within receiving means of capping head (inner whole of traversing hole 200) thanks to friction forces. Cap 400 is tight fitted within filled said receiving means.

The degree of introduction of cap 400 into traversing hole 200 depends on the respective dimensions of the cap and the hole. The more the respective dimensions correspond to each other, the less cap 400 is introduced into traversing hole 200.

In the present embodiment, cap 400 has been positioned within the receiving means of the capping head 180 only by virtue of the translational movement of the injection head and capping head.

This is a very convenient means for rapidly putting in place the cap within the capping head which does not require any other device. Moreover, bringing means 380 may be simplified since they do not need to be movable along vertical axis A.

However, other positioning means may be envisaged for positioning the cap within the receiving means of capping head 180.

Other bringing means for bringing cap 400 between capping head 180 and the dispensing opening of the container may be alternatively envisaged.

Reverting to FIG. 6C, once cap 400 has been appropriately positioned within traversing hole 200 bringing means 380 are withdrawn as indicated by the arrow.

Next, capping head 180 equipped with cap 400 is driven into a downwardly translational movement along axis A thanks to the accordingly actuated injection head 160 so as to place cap 400 around neck 320.

Figure 6D:
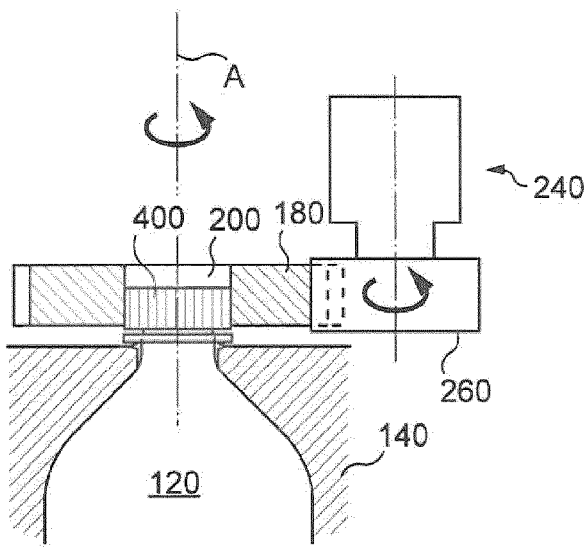

As represented in FIG. 6D, driving means 240 are activated in order to drive into rotation capping head 180 such as already described above.

Capping head is therefore driven into rotation around axis A. This rotational movement of capping head 180 causes cap 400 to be driven into rotation around neck 320, thereby tightly screwing cap 400 around the neck of the container.

Other capping techniques may be alternatively envisaged for capping container 120. For instance, press-on cap type or ultrasonic sealing techniques may be used. In case of ultrasonic sealing, the neck and the cap may be made together using over-moulding techniques.

It will be appreciated that the apparatus which has been described is of a particularly simple construction and has movable parts or components which are capable of moving only according to fewer and simple movements (translation and rotation).

Also, the capping head is either driven into a translational movement along longitudinal axis A (for example vertical axis) during the blowing, filling and capping process or driven into rotation during the last step of the capping process (FIG. 6D).

The invention claimed is:

1. A method of blowing and filling a container from preform, the method comprising:
   placing a preform within a mold;
   stretching the preform;
   injecting a liquid into the preform after stretching has started so as to cause expansion of the preform within the mold, thereby obtaining a blown and filled container;
   capping the blown and filled container; and
   the capping is performed within a predetermined period of time after obtaining the blown and filled container so as to increase pressure inside the capped container to between 0.3 and 1.5 bar above atmospheric pressure resulting from shrinking of the capped container.

2. The method of claim 1, wherein capping is performed between 1 second and 2 minutes after obtaining the blown and filled container.

3. The method of claim 2, wherein capping is preformed between 1 second and 30 seconds after obtaining the blown and filled container.

4. A method of blowing and filling a container from preform, the method comprising:
   placing a preform within a mold;
   stretching the preform;
   injecting a liquid into the preform after stretching has started so as to cause expansion of the preform within the mold, thereby obtaining a blown and filled container;
   capping the blown and filled container within a predetermined period of time after obtaining the blown and filled container; and
   shrinking the capped container so as to increase pressure inside the capped container to between 0.3 and 1.5 bar above atmospheric pressure.

5. The method of claim 4, wherein capping is performed between 1 second and 2 minutes after obtaining the blown and filled container.

6. The method of claim 4, wherein capping is performed between 1 second and 30 seconds after obtaining the blown and filled container.

* * * * *